United States Patent
Moreau

(10) Patent No.: US 11,060,626 B2
(45) Date of Patent: Jul. 13, 2021

(54) FLUID DISTRIBUTOR VALVE AND WATER PURIFICATION AND DISPENSING SYSTEM USING THE SAME

(71) Applicant: Merck Patent GmbH, Darmstadt (DE)

(72) Inventor: Laurent Moreau, Versailles (FR)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 16/485,837

(22) PCT Filed: Feb. 21, 2018

(86) PCT No.: PCT/EP2018/054225
§ 371 (c)(1),
(2) Date: Aug. 14, 2019

(87) PCT Pub. No.: WO2018/153888
PCT Pub. Date: Aug. 30, 2018

(65) Prior Publication Data
US 2020/0056715 A1    Feb. 20, 2020

(30) Foreign Application Priority Data

Feb. 24, 2017    (EP) ..................................... 17290027
Feb. 24, 2017    (EP) ..................................... 17290028
(Continued)

(51) Int. Cl.
*F16K 21/16*    (2006.01)
*F16K 3/24*    (2006.01)
(Continued)

(52) U.S. Cl.
CPC .............. *F16K 21/16* (2013.01); *C02F 1/001* (2013.01); *C02F 1/008* (2013.01); *C02F 1/32* (2013.01);
(Continued)

(58) Field of Classification Search
CPC ........ F16K 21/16; F16K 3/246; F16K 11/048; F16K 11/07; C02F 1/001; C02F 1/008; C02F 1/32; C02F 1/42; C02F 9/00
(Continued)

(56) References Cited

U.S. PATENT DOCUMENTS 2,169,043 A * 8/1939 Goehring ............... F16K 11/044
                                                        137/599.11
2,392,214 A * 1/1946 Cruzan .................... F01M 1/20
                                                        137/115.01
(Continued)

FOREIGN PATENT DOCUMENTS

CH    414286 A    5/1966
EP    1814007 A1    8/2007
EP    2592315 A1    5/2013

OTHER PUBLICATIONS

International Search Report and Written Opinion dated May 3, 2018 in co-pending PCT application No. PCT/EP2018/054219.
(Continued)

*Primary Examiner* — Michael J. Melaragno
(74) *Attorney, Agent, or Firm* — Nields, Lemack & Frame, LLC

(57) ABSTRACT

A fluid distributor valve (1) for repartitioning an inlet fluid stream (Z) into two outlet fluid streams (X, Y), comprising an inlet port (10), two outlet ports (11, 12), a first and a second valve mechanism (13, 14), one arranged upstream each outlet port (11, 12), wherein each valve mechanism (13, 14) comprises a valve body (15, 16) slidable in a cylindrical valve bore (17) in reciprocating strokes through a valve shaft (18), wherein the valve body (15, 16) includes a first portion (15a, 16a) that is formed with a progressively changing diameter so as to reduce a valve gap between the valve bore inner peripheral wall and the valve body outer peripheral wall at a plane (A, B) perpendicular to the stroke direction,
(Continued)

in a regular operating range of the valve mechanism (13, 14), from a maximum valve gap to a minimum valve gap, to reduce or increase the flow rate through the gap towards the associated outlet port (11, 12) upon the relative movement, and wherein at least one of the valve bodies (15, 16) of the valve mechanisms (13, 14), preferably both, is/are formed such that the minimum valve gap is maintained at the end position of the stroke of the valve body (15, 16) in the regular operating range.

20 Claims, 7 Drawing Sheets

(30) Foreign Application Priority Data

Feb. 27, 2017 (EP) .................................... 17290030
Feb. 27, 2017 (EP) .................................... 17290031

(51) Int. Cl.
*F16K 11/048* (2006.01)
*F16K 11/07* (2006.01)
*C02F 1/00* (2006.01)
*C02F 1/32* (2006.01)
*C02F 1/42* (2006.01)
*C02F 9/00* (2006.01)
*C02F 103/04* (2006.01)

(52) U.S. Cl.
CPC ................. *C02F 1/42* (2013.01); *C02F 9/00* (2013.01); *F16K 3/246* (2013.01); *F16K 11/048* (2013.01); *F16K 11/07* (2013.01); *C02F 2001/427* (2013.01); *C02F 2103/04* (2013.01); *C02F 2201/005* (2013.01); *C02F 2201/006* (2013.01); *C02F 2209/005* (2013.01); *C02F 2209/40* (2013.01); *C02F 2301/043* (2013.01); *C02F 2301/046* (2013.01)

(58) Field of Classification Search
USPC ............. 222/318; 137/872, 118.02; 251/118, 251/328, 129.11
See application file for complete search history.

(56) References Cited

U.S. PATENT DOCUMENTS

| | | | | |
|---|---|---|---|---|
| 2,682,386 A * | 6/1954 | Lindsay | ................... | F16K 39/02 251/74 |
| 2,739,613 A * | 3/1956 | Waldemar | ............... | F15B 13/04 137/625.27 |
| 2,782,801 A * | 2/1957 | Ludwig | ............... | F16K 11/0712 137/625.48 |
| 2,933,285 A * | 4/1960 | Tucker | ................... | F16K 41/04 251/324 |
| 3,329,165 A * | 7/1967 | Lang | ................... | F16K 27/029 137/625.5 |
| 3,570,541 A * | 3/1971 | Franz | ................... | F16K 11/044 137/625.66 |
| 3,581,764 A * | 6/1971 | Fife | ................... | F16K 5/0407 137/454.2 |
| 3,779,280 A * | 12/1973 | Evans | ................... | F16K 11/10 137/625.5 |
| 3,974,861 A * | 8/1976 | Goto | ................... | F01N 3/22 137/627.5 |
| 4,098,295 A * | 7/1978 | Haytayan | ................... | B25C 1/043 137/625.27 |
| 4,269,224 A * | 5/1981 | Dotti | ................... | F16H 61/0206 137/596.15 |
| 4,319,607 A * | 3/1982 | Fields | ................... | F16K 11/044 137/625.5 |
| 4,398,562 A * | 8/1983 | Saarem | ................... | F16K 31/041 137/625.47 |
| 4,432,215 A | 2/1984 | Yoshida | | |
| 5,007,458 A * | 4/1991 | Marcus | ................... | F16K 31/0634 137/625.5 |
| 5,184,773 A * | 2/1993 | Everingham | ...... | B60H 1/00485 137/115.25 |
| 5,899,231 A * | 5/1999 | Drori | ................... | B01D 53/0446 137/625.5 |
| 6,148,861 A * | 11/2000 | Finkeldei | ............ | F16K 11/207 137/872 |
| 6,190,558 B1 | 2/2001 | Robbins | | |
| 6,701,959 B1 * | 3/2004 | Flynn | ................... | F15B 13/044 137/625.65 |
| 7,329,358 B2 * | 2/2008 | Wilkins | ................... | B01D 61/48 210/748.11 |
| 7,392,971 B2 * | 7/2008 | Biener | ................... | F15B 13/015 137/596 |
| 7,481,929 B2 * | 1/2009 | Wilkins | ................... | B01D 61/48 210/143 |
| 7,669,831 B2 * | 3/2010 | Feigel | ................... | F16F 9/466 251/129.07 |
| 7,841,360 B2 * | 11/2010 | Bruck | ................... | F16K 17/0473 137/625.68 |
| 7,846,340 B2 * | 12/2010 | Freydina | ................... | B01J 47/08 210/744 |
| 7,856,999 B2 * | 12/2010 | Xiang | ................... | F16H 61/0276 137/118.02 |
| 7,862,710 B2 * | 1/2011 | Kloos | ................... | B01D 61/022 210/87 |
| 7,862,723 B2 * | 1/2011 | Cartwright | ........... | B01D 61/025 210/652 |
| 7,938,956 B2 * | 5/2011 | Gaignet | ................... | B01D 61/12 210/110 |
| 7,947,181 B2 * | 5/2011 | Cartwright | ............. | C02F 1/441 210/652 |
| 8,045,849 B2 * | 10/2011 | Zoccolante | ............. | C02F 9/005 392/485 |
| 8,052,865 B2 * | 11/2011 | Kloos | ................... | B01D 61/025 210/87 |
| 8,632,050 B2 * | 1/2014 | Stoeckel | ............. | F16K 31/0634 251/129.15 |
| 8,939,173 B2 * | 1/2015 | Yahr | ................... | F16K 31/04 137/625.2 |
| 9,010,372 B2 * | 4/2015 | Fangmeier | ............ | F16K 11/048 137/625.5 |
| 9,910,447 B2 * | 3/2018 | Pettinaroli | ............. | F16K 3/246 |
| 10,006,551 B2 * | 6/2018 | Wilfong | ................... | F16J 15/002 |
| 10,233,093 B2 * | 3/2019 | Mueller | ............. | F16K 11/0716 |
| 10,508,745 B2 * | 12/2019 | Groves | ................... | F16K 31/122 |
| 2003/0116739 A1 * | 6/2003 | Murao | ................... | F16K 31/0613 251/129.15 |
| 2005/0211938 A1 * | 9/2005 | Ryuen | ................... | F16K 11/0716 251/129.15 |
| 2005/0218362 A1 * | 10/2005 | Furuta | ................... | F16K 11/0716 251/129.15 |
| 2005/0218363 A1 * | 10/2005 | Furuta | ................... | F16K 31/0613 251/129.15 |
| 2006/0021664 A1 * | 2/2006 | Katsuta | ............. | F15B 13/0405 137/625.65 |
| 2007/0045580 A1 * | 3/2007 | Okitsu | ................... | F16K 31/04 251/129.11 |
| 2007/0069172 A1 * | 3/2007 | Brenner | ............. | F16K 31/0606 251/129.15 |
| 2010/0083676 A1 * | 4/2010 | Merritt | ................... | E03B 3/28 62/93 |
| 2011/0121214 A1 * | 5/2011 | Stoeckel | ............. | F16K 31/0634 251/129.01 |
| 2012/0012768 A1 * | 1/2012 | Yahr | ................... | F16K 31/04 251/129.11 |
| 2012/0061600 A1 * | 3/2012 | Neff | ................... | F16K 41/12 251/129.15 |
| 2012/0211686 A1 * | 8/2012 | Okamoto | ............ | F16K 31/0624 251/129.15 |
| 2013/0105720 A1 * | 5/2013 | Kabel | ................... | F16K 27/0263 251/328 |

(56) References Cited

U.S. PATENT DOCUMENTS

| | | | |
|---|---|---|---|
| 2013/0105721 A1* | 5/2013 | Kabel | F16K 11/044 |
| | | | 251/328 |
| 2013/0263955 A1* | 10/2013 | Hirota | F16K 11/10 |
| | | | 137/636 |
| 2013/0291975 A1* | 11/2013 | Fangmeier | F16K 11/18 |
| | | | 137/636.1 |
| 2013/0340849 A1* | 12/2013 | Peel | G05D 7/0617 |
| | | | 137/341 |
| 2014/0027379 A1 | 1/2014 | Volker | |
| 2014/0097130 A1* | 4/2014 | Wilfong | F16K 11/0712 |
| | | | 210/87 |
| 2016/0252185 A1* | 9/2016 | Wilfong | F16K 25/005 |
| | | | 137/244 |
| 2017/0276253 A1* | 9/2017 | Hironaka | F16K 27/048 |
| 2018/0335151 A1* | 11/2018 | Wilfong | F16J 15/002 |
| 2019/0308887 A1* | 10/2019 | Mueller | F16K 31/5286 |
| 2019/0345051 A1* | 11/2019 | Keary | C02F 9/005 |
| 2020/0055743 A1 | 2/2020 | Roitel et al. | |
| 2020/0141500 A1* | 5/2020 | Wilfong | F16J 15/002 |

OTHER PUBLICATIONS

International Search Report and Written Opinion dated May 25, 2018 in corresponding PCT application No. PCT/EP2018/054225.
Office action dated Nov. 20, 2020 in co-pending U.S. Appl. No. 16/485,836.

* cited by examiner

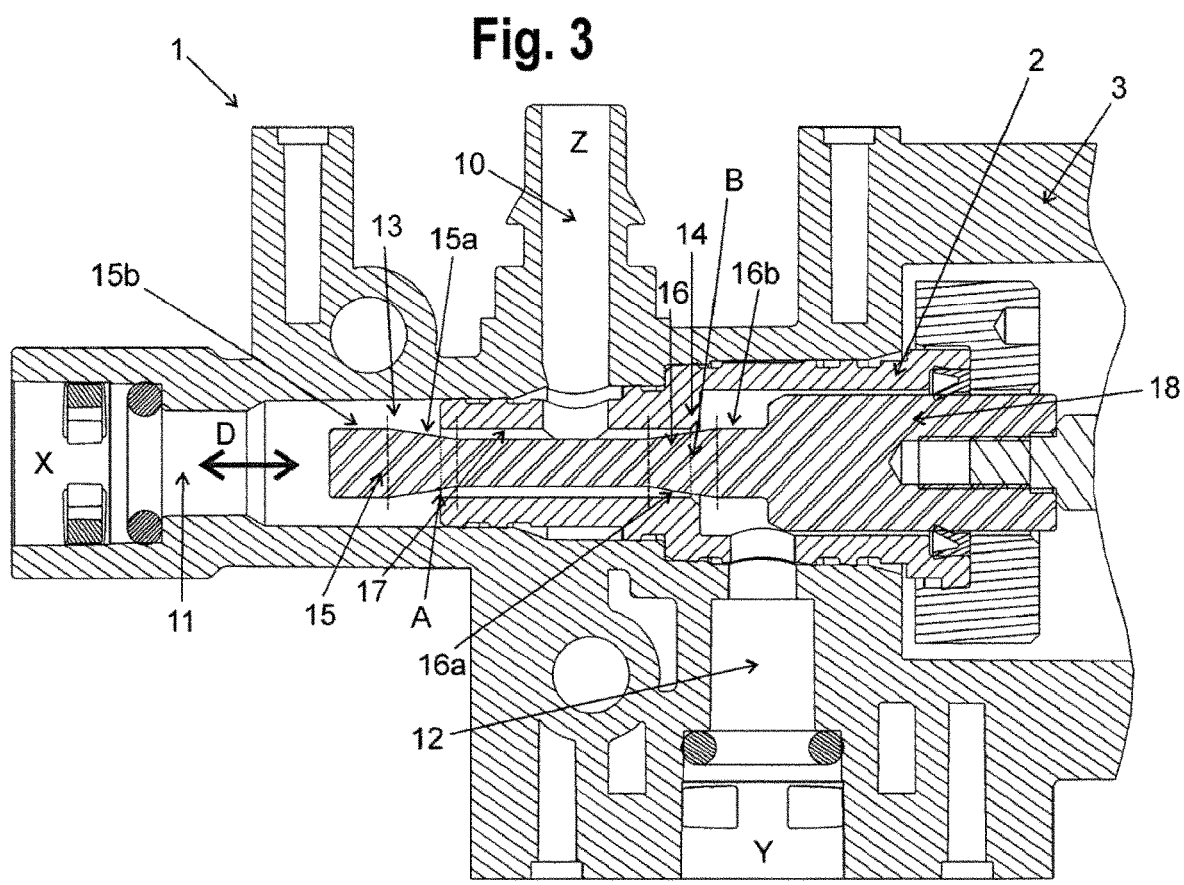
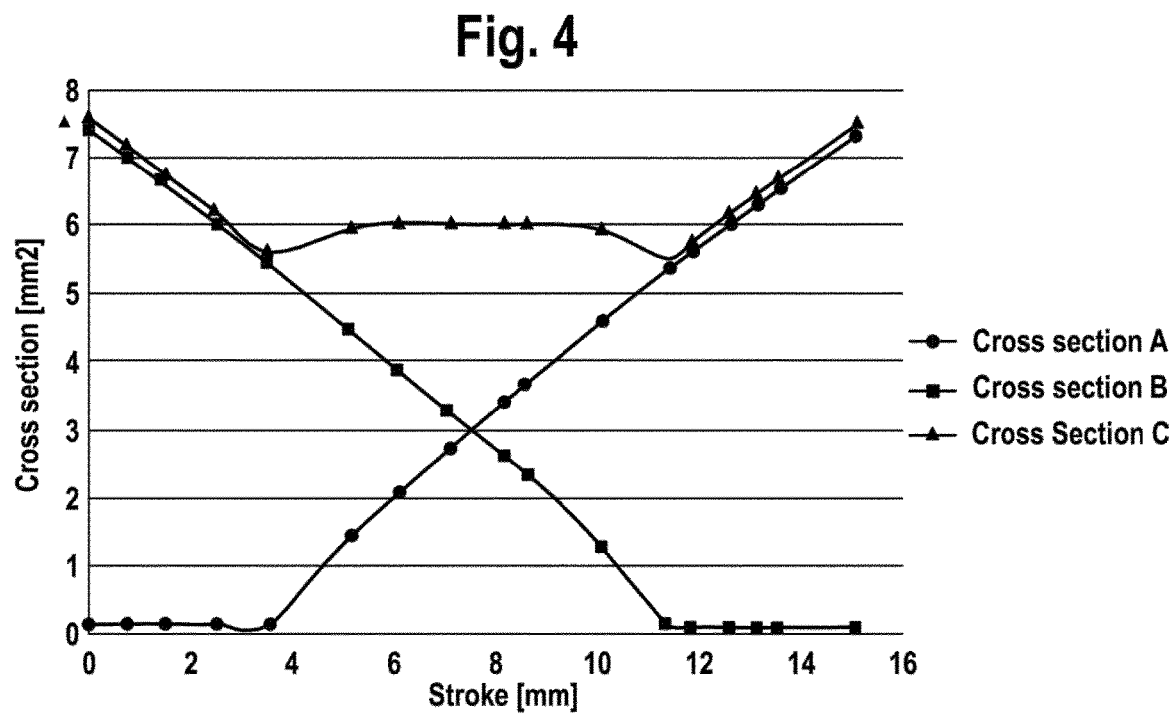

FLUID DISTRIBUTOR VALVE AND WATER PURIFICATION AND DISPENSING SYSTEM USING THE SAME

This invention concerns a fluid distributor valve for repartitioning an inlet fluid stream into two outlet fluid streams.

This invention also concerns a water purification and dispensing system using such a fluid distributor valve.

The present invention specifically concerns an actuator driven fluid distributor valve as a hydraulic component that enables an accurate control of the fluid repartition from the inlet fluid stream to the two outlet fluid streams from a drop-by-drop rate to a maximum flow rate, i.e. up to four litres per minute. It is as such particularly suitable for use in a water purification and dispensing system comprising a closed water recirculation loop and water purification equipment upstream of the distributor valve which in return branches the water recirculation loop to points of use where the purified water is dispensed.

In the field of water purification it is frequently necessary to divide a fluid stream into two separate fluid streams. Two known implementations for this task are shown in FIGS. 1a and 1b. The implementation in FIG. 1a uses a 3-way solenoid valve 20 for directing the inlet fluid stream X into a first outlet fluid stream Z or a second outlet fluid stream Y. While different distribution ratios can be achieved in that a proportional solenoid valve is used, the stroke of proportional solenoid valves is commonly very small (<1 mm) so that the valve has to be frequently calibrated. Moreover, the type of valve is expensive and, especially due to the very small stroke length, difficult to drive precisely and it is therefore normally used for specific and limited applications only.

Another solution shown in FIG. 1b is the use of a 2-way solenoid valve 21 associated to a downstream check valve 21. The check valve 21 implies a significant cracking pressure meaning that the hydraulic circuit is continuously pressurized. This is normally considered a drawback.

Other manually or electrically driven fluid distributor valves are known. One such distributor valve is shown in FIG. 2 and it has an inlet port 23 for the inlet stream Z, two outlet ports 24, 25 for the outlet streams X and Y, and first and second valve mechanisms 27, 26, one arranged upstream of each outlet port. In this hydraulic distributor valve a central valve body 28 is provided so as to be vertically moveable within a housing which has two valve bores arranged to be closed by the valve bodies of the valve mechanisms in the ratio range of 0 to 100%. In the representation of FIG. 2 about 100% of the inlet flow Z is directed to the first outlet Y since the second valve mechanism 26 is fully opened and the first valve mechanism 27 is fully closed. With an upward movement of the valve body 28 the flow rate through the second outlet X increases to 100% while the flow rate through the first outlet Y decreases until 0% when the second valve mechanism 26 is fully closed and the first valve mechanism 27 is fully opened. In this hydraulic distributor valve, too, the flow rate distribution between the two outlet fluid streams depends on the position of the valve body and the breaking pressure thereof from each of the fully closed positions at the first and second valve mechanisms.

The various fluid distributor concepts discussed above have various drawbacks, one being that the available strokes between fully closed and fully opened positions are relatively small so that it is difficult to accurately link a valve body position to a particular flow rate through the first and second outlets. It is also difficult to know the position of the valve body at which the distribution commences. In order to accurately control small flow rates the valve body position has to be controlled within extremely small moving ranges. While such settings and small stroke handling is possible when the valve body is manually driven, such manual solution is not precisely repeatable, is difficult for setting extremely small flow rates, and is not suitable for setting predetermined flow rates at the respective outlets with the sufficient precision.

While electrical actuators are known for driving the valve mechanisms in a predetermined operating manner and sequence, the relatively small stroke lengths are nevertheless difficult to handle with an electric motor drive. Costly transmissions arranged between the electric motor and the valve mechanism are one but not preferable option. The problem of the delayed commencement of flow through a particular outlet from the closed position due to the breaking of the valve mechanism at its closed valve seat and the difficulty of dispensing extremely small flow rates still remains to be solved. Further, precise determination of dispensing flow rate requires frequent calibration of the valve stroke vs. the flow rate.

A water purification system of the type in which the fluid distributor valve of the present invention can be advantageously equipped and used aims at producing preferably ultrapure water and offering the purified water at one or more dispensing sites in a desired volume. Ultrapure water can be defined as the highest quality reagent grade water that exceeds ASTM Type I standards and has a specific resistance of more than 18.0 MΩ-cm at 25° C. and a total organic carbon (TOC) content of less than five parts per billion (ppb).

Many applications require the use of ultrapure water, in particular in biological and chemical analysis laboratories. The components for purifying water in such a system according to the desired purity level are known as such. Depending on the volume of water required by the respective application or user the purification systems are required to distribute the purified water at or near a maximum treatment capacity and throughput, which can be for example, two or three litres per minute, or at a throughput that is lower than the maximum treatment capacity down to a drop-by-drop dispensing rate. In some applications it is necessary to deliver exactly as possible a predetermined volume of purified water and the measuring of the volume should be automated without the user being required to monitor and measure the dispensed volume.

What is generally needed is a water purification and dispensing system which can produce and selectively distribute and accurately dispense the purified water, preferably at the ultrapure level, at progressive rates from a large treatment throughput, for example to fill a container as quickly as possible, to low or very low throughput, for example to adjust the water level in a container, down to even a drop-by-drop rate. The system should, at the same time, be equipped to automatically and precisely distribute the purified water with a predefined volume, for example to fill certain containers with a predetermined exact volume.

A water purification and dispensing system and method for this purpose is, for example, disclosed in the document EP 1814007A1. The conceptual layout of the water purification and dispensing system disclosed in this document is shown in FIG. 11 and it comprises a closed water recirculation loop 106 supplied at a water inlet point with water to be purified and it has one or more outlet points of use of the purified water. The system also includes pumping means 103 and water purification means on the loop respectively downstream of the inlet point and upstream of the outlet points in the water flow direction through the loop. The water purification means typically includes a pre-treatment unit 151, an UV lamp 152, preferably operating at a wavelength of 185 nm, and a finishing or polishing cartridge 153. This known system includes two independent valves, a first valve on the loop upstream of the pumping means and a second valve respectively upstream of each point of use outlet point.

This system uses two-way solenoid valves as the first valve and one or more second valves, wherein one of them is provided as the first or recirculation valve in the recirculation loop, with no additional back-pressure device like a preloaded check valve, and the other(s) is/are provided as the second or dispensing valve(s) on the downstream side of the outlet from the water purification means for producing the purified water, for use in distributing the purified water at the respective dispensing sites. In this system recirculation occurs with the dispensing solenoid valve(s) being closed and the recirculation solenoid valve being open with no internal pressure in the purification loop, and dispensing occurs with the recirculation solenoid valve being closed and the dispensing solenoid valve(s) being open. The dispensing flow rate is controlled by the speed of the dispensing pump's DC motor. This configuration allows simultaneous manual dispensing by selectively operating the respective dispensing solenoid valve upstream of the respective points of use outlet points. A limitation of relying on the DC motor speed control for adjusting the dispensing volume or rate is, however, that very low flow rates like drop-by-drop cannot be performed as the DC motor cannot be controlled at a sufficiently low speed. Moreover, there is a certain delay or lag associated with a DC motor start up at a low voltage required for setting such a low speed. The document EP 1814007A1 discloses that very low dispensing flow rates are achieved by opening the recirculation solenoid valve while dispensing at the point of use outlet point. Nevertheless, it is not possible to control very low dispensing flow rates like drop-by-drop using such a setup as the dispensing flow rate is dependent on the final filter pressure drop. Another drawback of the system is that the scaling of the dispensing volumes from drop-by-drop to large flow rates is not perfect.

It is an object of the present invention to provide a fluid distributor valve for repartitioning an inlet stream into two outlet streams which avoids at least some drawbacks discussed above and allows for a precise setting of a distribution ratio between the outlet streams from a drop-by-drop rate to a full dispensing rate.

It is another object of the present invention to provide a water purification and dispensing system comprising a closed water circulation loop and improved with respect to the dispensing characteristics i.e. the range of dispensing volume and the accuracy of dispensing of a particular volume.

The present invention provides a fluid distributor valve with the features of claim 1 and a water purification and dispensing system defined in claim 17 using the fluid distributor valve of the invention. Preferred embodiments of the fluid distributor valve are defined in the dependent claims.

The present invention thus concerns a fluid distributor valve for repartitioning an inlet fluid stream into two outlet fluid streams, comprising an inlet port, two outlet ports, a first and a second valve mechanism, one arranged upstream each outlet port, wherein each valve mechanism comprises a valve body slidable in a cylindrical valve bore in reciprocating strokes through a valve shaft, wherein the valve body includes a first portion that is formed with a progressively changing diameter so as to reduce a valve gap between the valve bore inner peripheral wall and the valve body outer peripheral wall at a plane perpendicular to the stroke direction, in a regular operating range of the valve mechanism, from a maximum valve gap to a minimum valve gap, to reduce or increase the flow rate through the gap towards the associated outlet port upon the relative movement, and wherein at least one of the valve bodies of the valve mechanisms, preferably both, is/are formed such that the minimum valve gap is maintained at the end position of the stroke of the valve body in the regular operating range.

The fluid distributor valve of the invention is capable of dividing and repartitioning the inlet fluid stream into the two outlet fluid streams and the flow rate distribution between the outlet streams is controlled by the operation of the valve shaft, preferably through a drive actuator which can be part of the fluid distributor valve or can be added as a separate component. Even in its extreme end positions of the regular operating range of the one or both valve mechanism(s) and thus the associated outlet(s) is/are never fully closed but a very small drop-by-drop flow rate is still maintained, in the regular operating range. In that the minimum valve gap is maintained at the end position, in the regular operating range, of the valve body of one or both valve mechanisms, the problems associated with the breaking delay of valve mechanisms having the respective valve body in full contact with the valve seat to completely close the respective valve mechanism is avoided.

In that the portion with the minimum valve gap is extended over a defined length in the stroke direction before the respective end position of the stroke of the valve body in the regular operating range is reached (this portion will be called a "capillary area"), the pressure drop at the respective outlet can be increased without a further reduction of the cross section at the valve mechanism with the consequence that the flow rate can be reduced to practically zero without the problems associated to the full contact engagement between the valve body and the valve bore in known valve mechanisms. Thereby, the responsiveness and the precision of the flow rate distribution of the inlet fluid stream into the two outlet fluid streams can be improved especially with respect to rates close to zero which are particularly important where the fluid distributor valve is employed in a water purification and dispensing system for setting the dispensing flow rate.

Preferably, the at least one valve body has a second portion adjacent to the first portion formed with the progressively changing diameter that retains the diameter of the first portion, which defines the minimum valve gap, over a defined length in the stroke direction before the end position of the stroke of the valve body in the regular operating range is reached.

Preferably, the length of the second portion in the stroke direction is between 1 to 5 mm.

Preferably, the diameter defining the minimum valve gap and the length in the stroke direction of the second portion of the valve body are dimensioned such that the flow rate through the gap at the end position of the stroke of the valve body in the regular operating range is smaller than 1%, preferably smaller than 0.2%, of the inlet flow rate, preferably smaller than 1 l/h, at an inflow pressure of 0.1 to 6 bar.

Preferably, the first portions of the valve bodies of the two valve mechanisms are arranged such that their diameters change in opposite sense along the stroke direction.

Preferably, the valve bodies are formed such that the sum of the valve gaps at the planes perpendicular to the stroke direction of the first portions of the two valve mechanisms is substantially constant at each valve shaft position in the regular operating range.

Preferably, the valve bodies of the first and second valve mechanisms are arranged on a common valve shaft arranged to be linearly movable in the stroke direction.

Preferably, the cylindrical valve bore is formed in a cartridge which is inserted and fixed in an external housing.

Preferably, the cartridge and the housing are made from different materials.

Preferably, the fluid distributor valve further comprises a drive actuator associated to the valve shaft for sliding the valve bodies in the reciprocating strokes.

Preferably, the drive actuator is a linear motor or a rotary motor, preferably in the form of a step motor, and in case of a rotary motor preferably coupled with a transmission converting the rotation to a linear stroke.

Preferably, valve shaft has a mechanical stop position, preferably outside the cylindrical valve bore, arranged with a spacing in the stroke direction from at least one of the end positions of the regular operating range.

Preferably, the valve is configured such that the valve shaft can be moved to the mechanical stop position in a drive mode of the drive actuator that is distinct from the drive mode in which the valve is operated in the regular operating range.

Preferably, the drive actuator has an encoder for determining the moving position of the drive actuator and the mechanical stop is arranged to be used for calibrating the drive actuator.

Preferably, the valve shaft is arranged so as to allow it to be manually driven in the regular operating range.

Preferably, an inlet into the cylindrical valve bore communicating with the inlet port of the valve is perpendicular to the stroke direction and outlets from the valve bore communicating with the outlet ports are parallel to the stroke direction.

The invention also provides a water purification and dispensing system comprising a (closed) water recirculation loop including a water inlet for introducing water to be purified, pumping means for pumping water through said water recirculation loop in a flow direction, water purification means for purifying water downstream of said water inlet, a dispensing portion of the water recirculation loop including one or more outlet(s) for purified water branched from said water recirculation loop downstream of said water purification means, a first valve arranged between each outlet and said water recirculation loop, for controlled dispensing of the purified water from said recirculation loop through the respective outlet, a second valve arranged in said dispensing portion of the water recirculation loop downstream of said first valve(s) and upstream of said pumping means, a bypass passage branched from said water recirculation loop and bypassing said dispensing portion of the water recirculation loop including said first valve(s) and said second valve, a third valve for controlling the flow rate through said bypass passage, and a fourth valve for controlling the flow rate into said dispensing portion of the water recirculation loop including said first valve(s) and said second valve, wherein said third valve and said fourth valve are integrated in the form of a fluid distributor valve of the invention.

The fluid distributor valve of the present invention and a water purification and dispensing system of the present invention will now be described in connection with the preferred embodiments and using the attached drawing as reference. In this drawing:

FIGS. 1a and b show prior concepts for repartitioning an inlet fluid stream into two outlet fluid streams;

FIG. 3 shows a fluid distributor valve according to the invention in a cross sectional view;

FIG. 4 shows a diagram indicating a cross section variation at the valve mechanisms in relation to a stroke length of a valve shaft;

Figure 6:
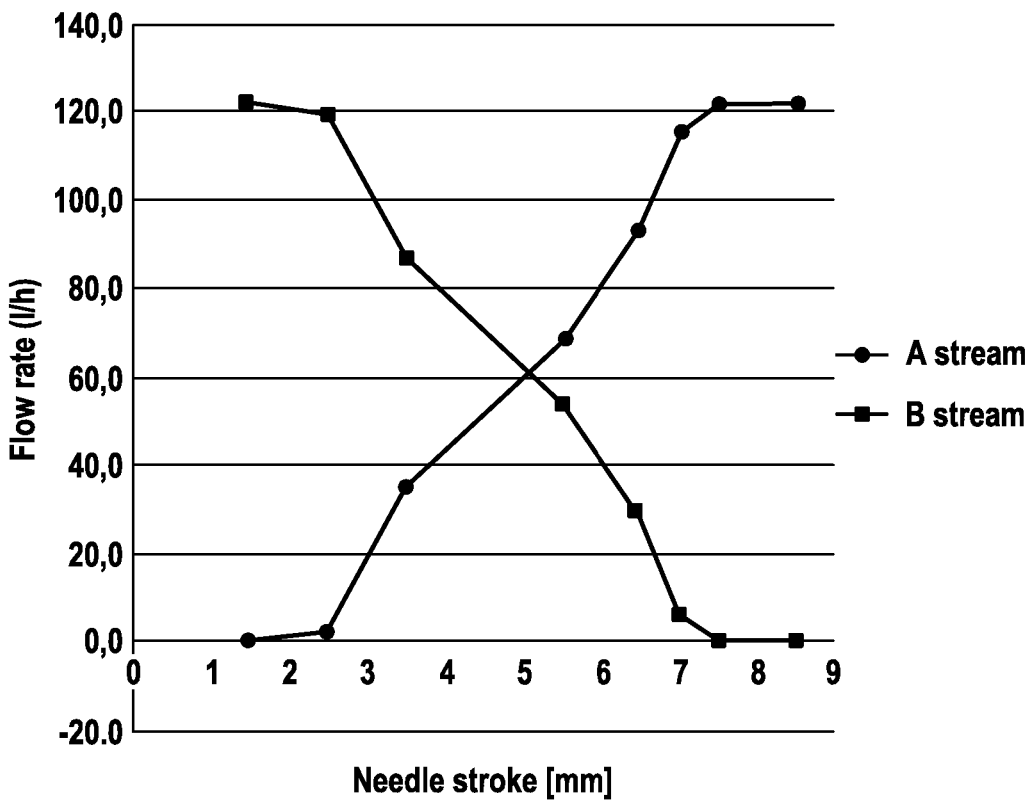
Figure 7:
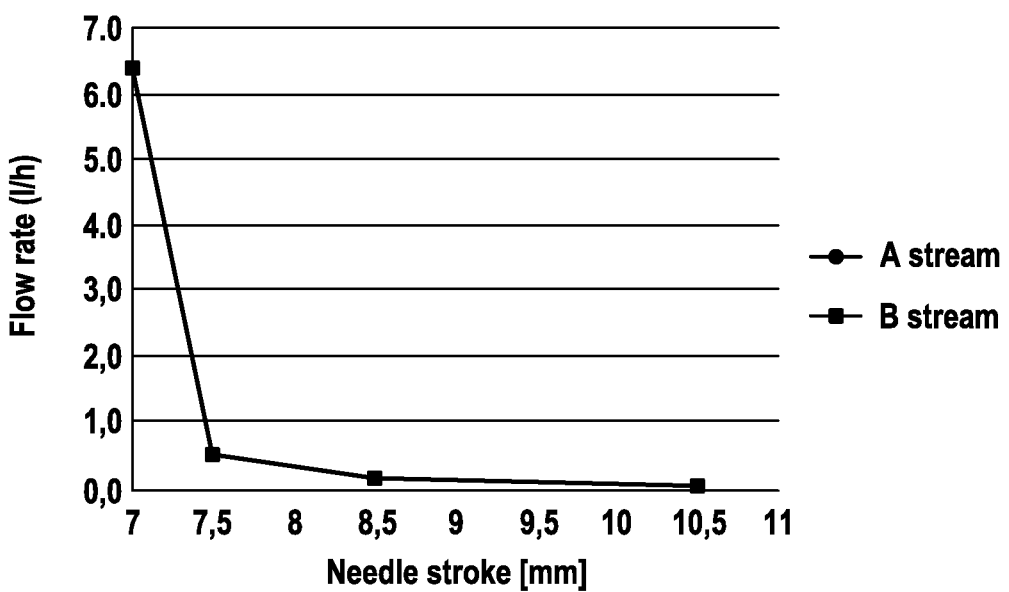
Figure 8:
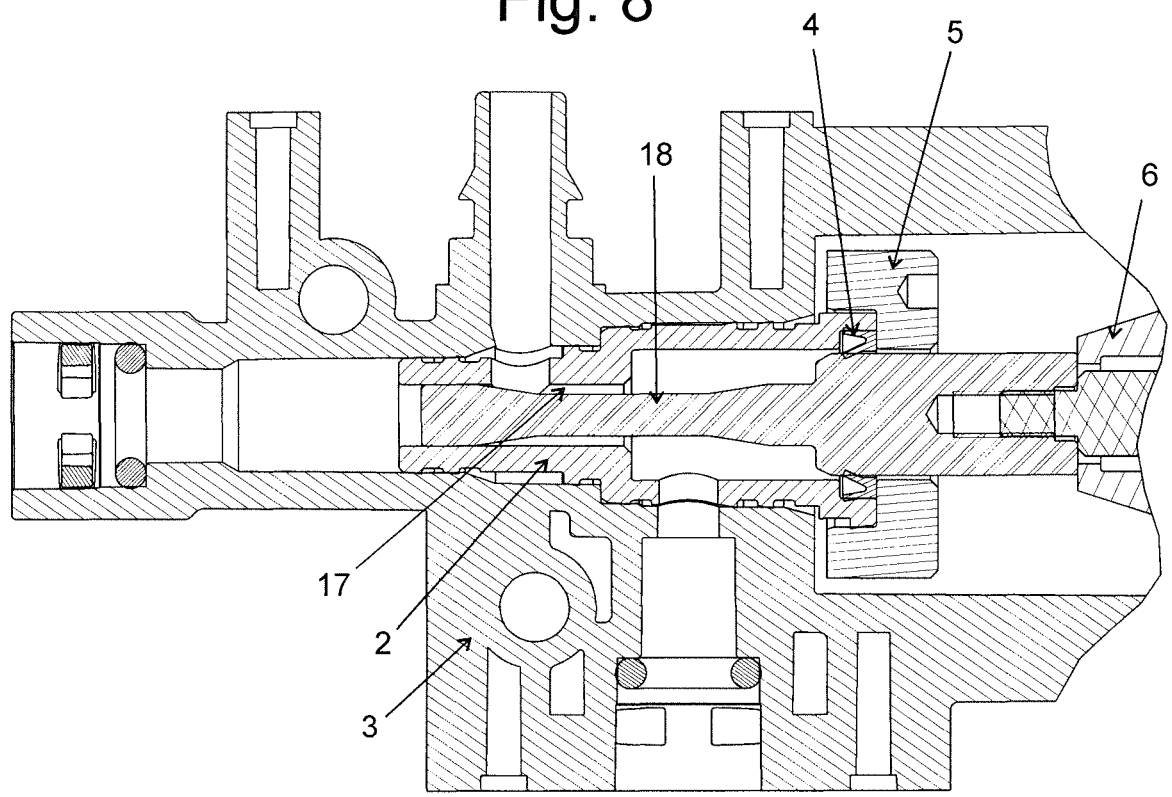
Figure 9:
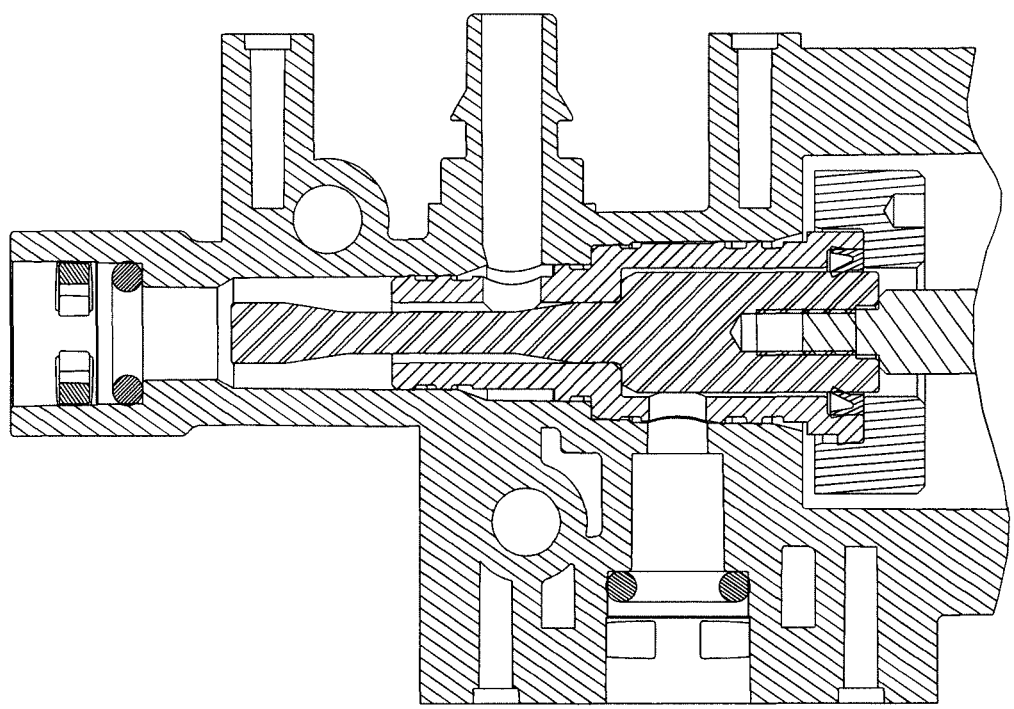
Figure 10:
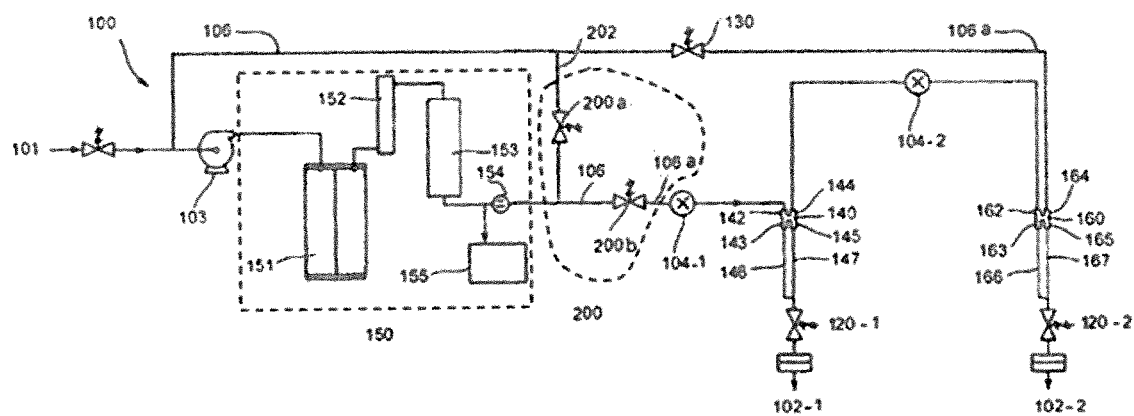
Figure 11:
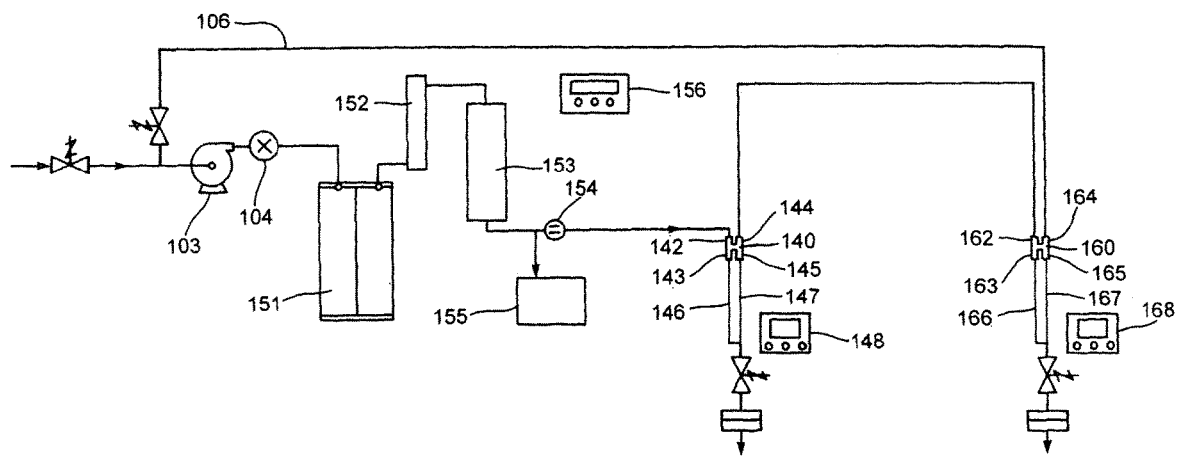

FIGS. 5a to d show various positions of the fluid distributor valve of the invention between extreme left and extreme right positions within the regular operating range;

FIG. 6 shows diagram indicating the relation between the flow rate and the stroke length of a valve shaft at an inlet flow rate of 120 l/h and an inlet pressure of 1 bar;

FIG. 7 shows a diagram indicating the relation between the flow rate and the stroke length of FIG. 6 zoomed into the capillary area of the fluid distributor valve;

FIG. 8 shows the fluid distributor valve of the invention in the larger context including a drive actuator;

FIG. 9 shows the fluid distributor valve of the invention with the valve body in a dead stop position (left);

FIG. 10 is a diagram of an embodiment of a water purification and dispensing system in which the fluid distributor valve according to the invention can be advantageously used; and FIG. 11 is a diagram of a water purification and dispensing system disclosed in the prior art.

An embodiment of the fluid distributor valve of the invention will now be described in detail.

The fluid distributor valve 1 of the present invention according to one exemplary embodiment is shown in FIGS. 3, 5, 8 and 9 (in FIG. 8 with an attached drive actuator 6). The fluid distributor valve is for repartitioning or distributing an inlet fluid stream Z into two outlet fluid streams X, Y. The fluid distributor valve 1 (in the following only "valve") comprises an inlet port 10 for the inlet fluid stream Z and two outlet ports 11, 12 for the outlet fluid streams X, Y. The entire flow rate of the inlet fluid stream Z is divided and repartitioned by the valve into the two outlet fluid streams X, Y and the flow rate distribution between these two outlet fluid streams is dynamically controlled by first and second valve mechanisms 13, 14, one arranged upstream each outlet port.

The valve mechanisms are configured such that the flow rate of the fluid stream X at one outlet port is in the range of 0.1 to 99.9% of the inlet fluid stream Z and the flow rate of the fluid stream of the fluid stream Y at the second outlet port is accordingly Y=100%–X % of the inlet stream Z. Each valve mechanism 13, 14 comprises a valve body 15, 16 slidable in a cylindrical valve bore 17 in reciprocating strokes along a direction D caused by moving a valve shaft 18 connected to the valve bodies by operating the motorized drive actuator 6 or by manual operation. In the embodiment used to describe the invention the valve bore 17 is a continuous valve bore that is the same for both valve mechanisms. Each of the valve bodies 15, 16, which in this embodiment are arranged on a common valve shaft 18 arranged to be lineally movable in the stroke direction D by operation of the motorized drive actuator 6, includes a first portion 15a, 16a that is formed with a progressively changing diameter so as to reduce a valve gap that exists between the valve bore inner peripheral wall and the valve body outer peripheral wall at a plane A, B perpendicular to the stroke direction when the valve is operated in a regular operating range of the valve mechanisms, from a maximum valve gap to a minimum valve gap to thereby reduce or increase the flow rate towards the associated outlet port upon the relative movement.

The gap accordingly is the free cross section at the respective plane A, B that is the results from the inner diameter (cross section) of the valve bore 17 at the plane A, B minus the diameter (cross section) of the valve body located at the plane in the respective position of the valve body/valve shaft. When the valve shaft is sliding in the direction D along its longitudinal axis and assuming that the cross section of the valve bore 17 is constant, the free cross section at the respective planes A, B is changing depending on the change of diameter (cross section) of the valve bodies.

In the preferred embodiment the first portions 15a, 16a of the valve bodies of the two valve mechanisms are arranged such that their respective diameters change in opposite sense along the stroke direction so that an increase of the flow rate at one of the outlets at the same time leads to a reduction of the flow rate at the other outlet, wherein the sum of the flow rates necessarily is the same and corresponds to the inlet flow rate. In a preferred embodiment the valve bodies are formed such that the sum of the cross sections at the planes A, B perpendicular to the stroke direction of the first portions of the two valve mechanisms is substantially constant at each valve shaft position in the regular operating range. However, depending on the application, the cross section evolution of the valve bodies can be non-linear with the valve shaft stroke thereby leading to a progressive distribution of the flow rate between the outlet ports. In general, the evolution and absolute value of the cross section of the valve bore at the planes A, B and of the first portions of the valve bodies related to the stroke length define a particular setup of the hydraulic fluid distribution including pressure drop and flow rates at each respective valve position within the regular operating range.

The flow rate repartitioning between the outlet ports theoretically works perfectly from 0 to 100% of the inlet flow rate on each port if the cross section at the planes A, B can be reduced to zero. Practically, however, it is very difficult to reduce the cross section to zero due to production tolerances on the valve bore and the valve bodies and dimensional changes in operation due to temperature influences and/or wear. While it would be possible to provide a dead stop engagement or sealing contact between the valve body and the valve bore at each respective end position in the regular operating range as in the prior art, such dead stop is not preferable as mentioned above due to the initial breaking delay and momentum required to move the respective valve mechanisms from such dead stop position, and due to the difficulty of knowing exactly the position of a drive actuator, thus hindering the precise distribution and repartitioning of fluid towards the ends of the regular operating range where very small volumes of fluid should be dispensed from a respective outlet. Further, a reduction of the cross section down to a substantially complete closure of the gap at the end position of the stroke in the regular operating range leads to the risk of wedging the valve body in the valve bore when surfaces get in contact.

It would accordingly be necessary to reduce the gap between the valve body and the valve bore to below 0.01 mm but this is not only costly but also difficult to maintain in actual operation due to various influences. The invention accordingly provides that at least one of the valve bodies 15, 16 of the valve mechanisms 13, 14, preferably both, is/are formed such that the minimum valve gap at the end position of the stroke of the valve body in the regular operating range is substantially maintained constant in a certain zone over an axial length in the vicinity of the end position of the stroke in the regular operating range. This can be achieved in that the at least one valve body, preferable both, have a second portion 15b adjacent to the first portion 15a that is formed with the progressively changing diameter, which second portion 15b retains the maximum diameter of the first portion 15a defining the minimum valve gap over a defined length in the stroke direction before the end position of the stroke of the valve body in the regular operating range is reached. The length of the second portion 15b, which can be called a "capillary area" of the valve mechanism, is preferably between is 1 to 5 mm but depends on the particular pressure of the inlet fluid stream. The higher the pressure, the longer the capillary area in order to still substantially block the fluid flow at the respective outlet at the end position of the stroke of the valve body without bringing the surfaces of the valve body and the valve bore into contact with each other.

With the provision of this capillary area the pressure drop at the outlet fluid stream can be increased without further cross section reduction simply by extending the length of the capillary area maintaining a substantially constant cross section over a certain axial length of the valve body stroke. Theoretically, the flow rate can be reduced to zero with an infinite length but the length in practice is tuned with the minimal flow rate target, the pressure at the valve inlet and the available stroke length. FIG. 4 shows an example diagram indicating the cross section variation related to the stroke length wherein the cross section refers to the free cross section remaining between the valve body and the valve bore in mm$^2$.

The diameter defining the minimum valve gap and the length in the stroke direction of the second portion of the valve body are dimensioned such that the flow rate through the gap in the end position of the stroke of the valve body in the regular operating range is smaller than 1% of the inflow rate, preferably smaller than 0.2% of the inflow rate but preferably larger than 0.1%. The amount of the flow rate, for example for the application in a water purification and dispensing system, should be preferably smaller than 1 l/h at an inflow pressure of 0.1 to 6 bar.

Figure 1A:
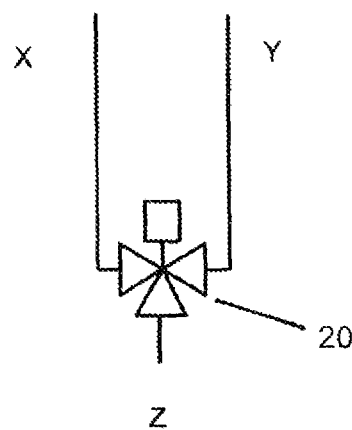
Figure 1B:
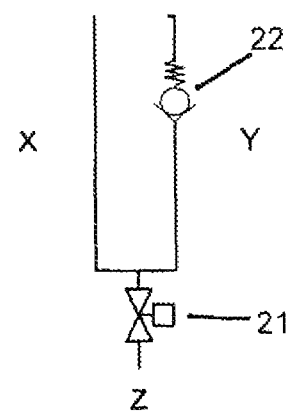
Figure 2:
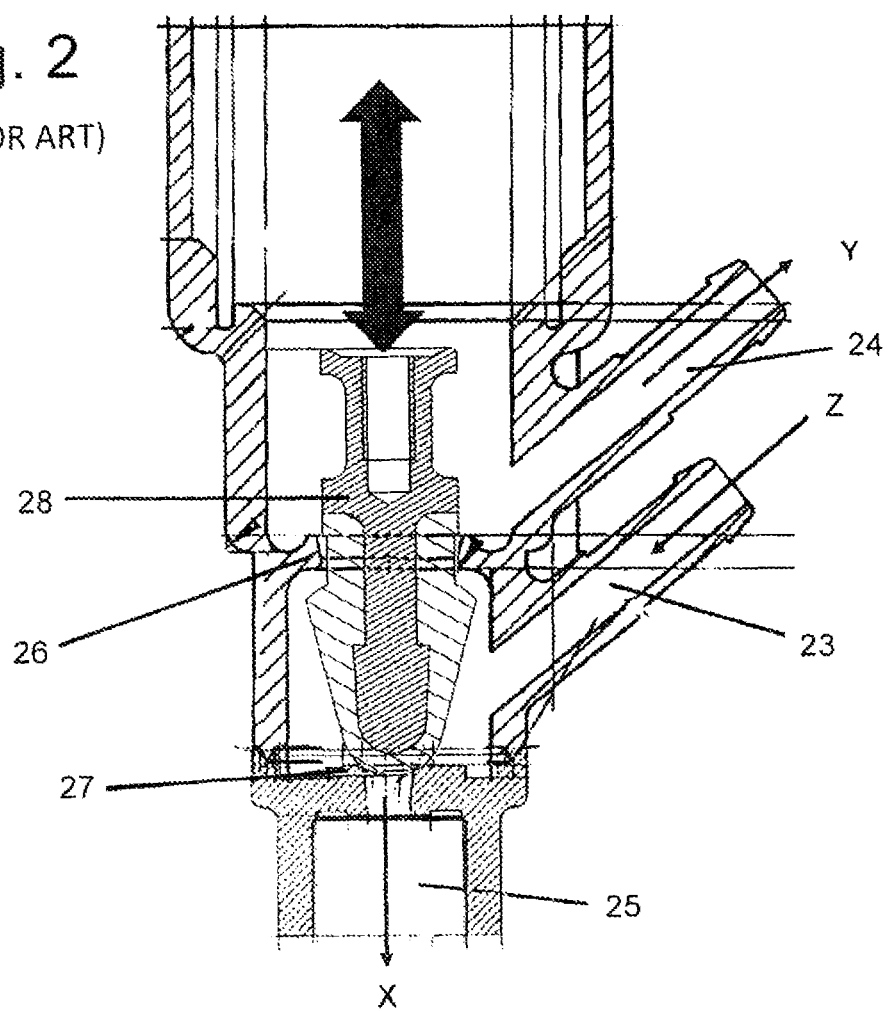
FIG. 2 shows another fluid distributor valve known in the art.
Figure 5A:
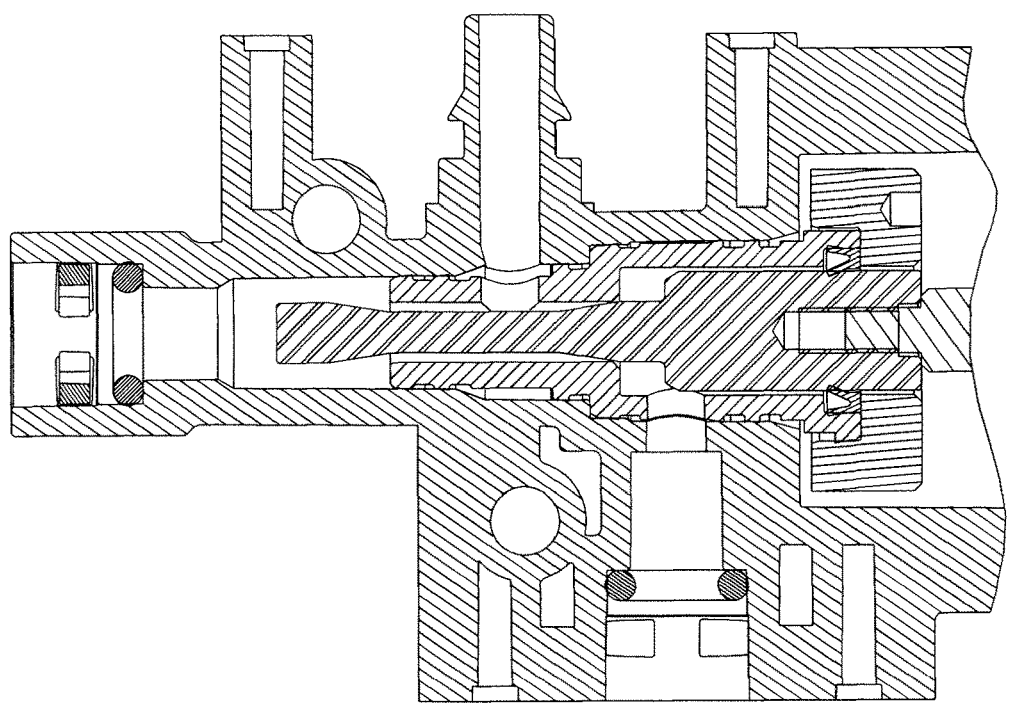
Figure 5B:
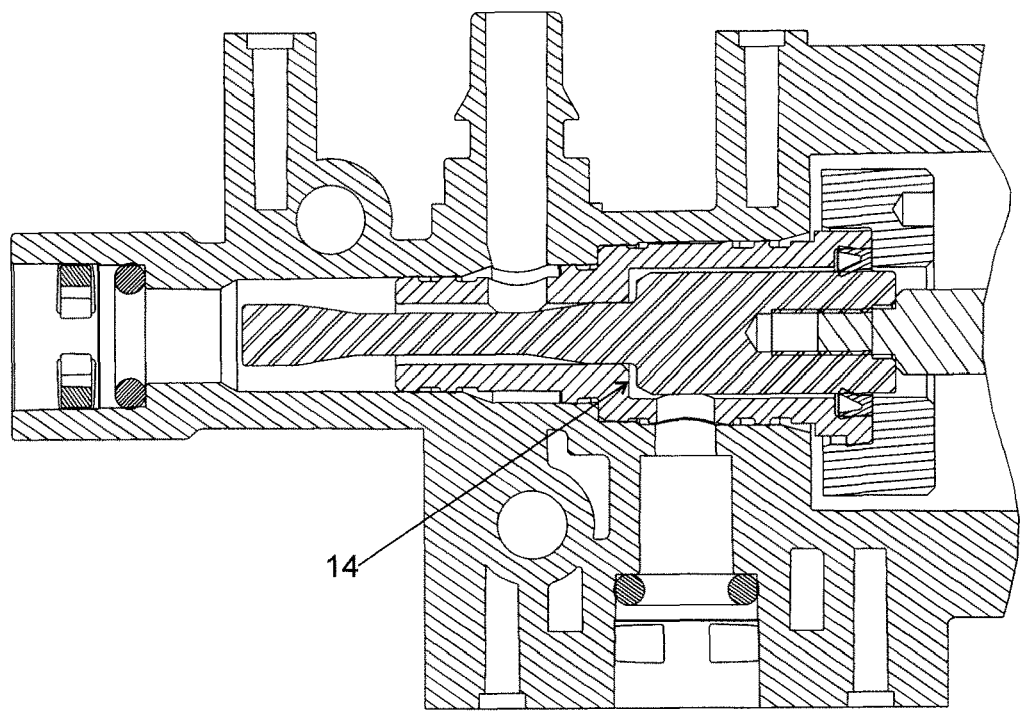
Figure 5C:
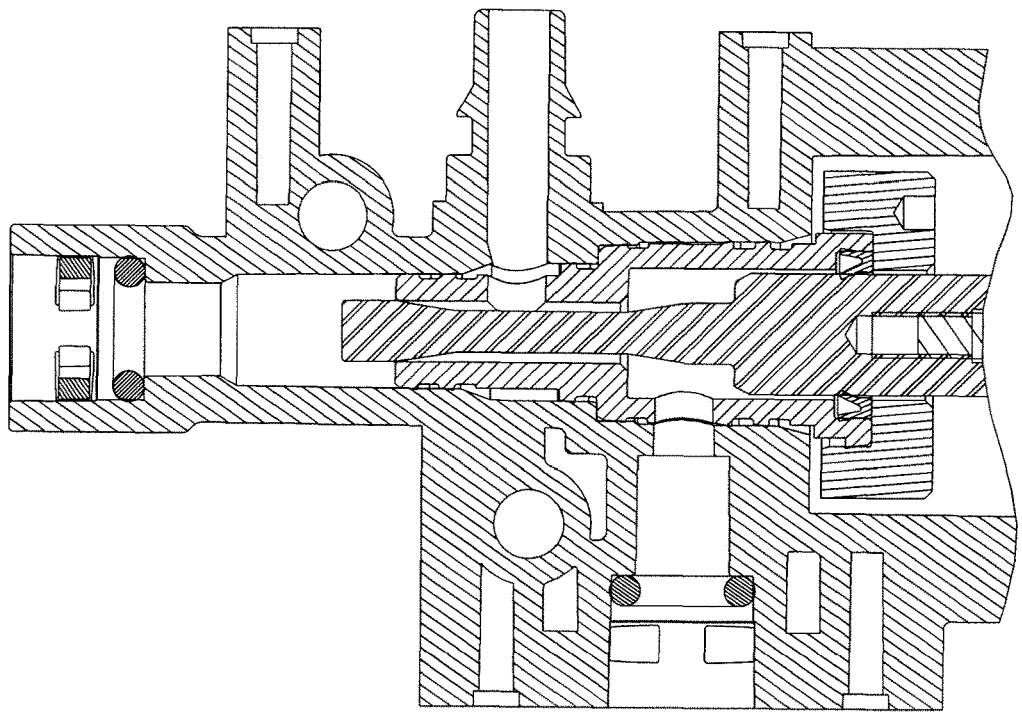
Figure 5D:
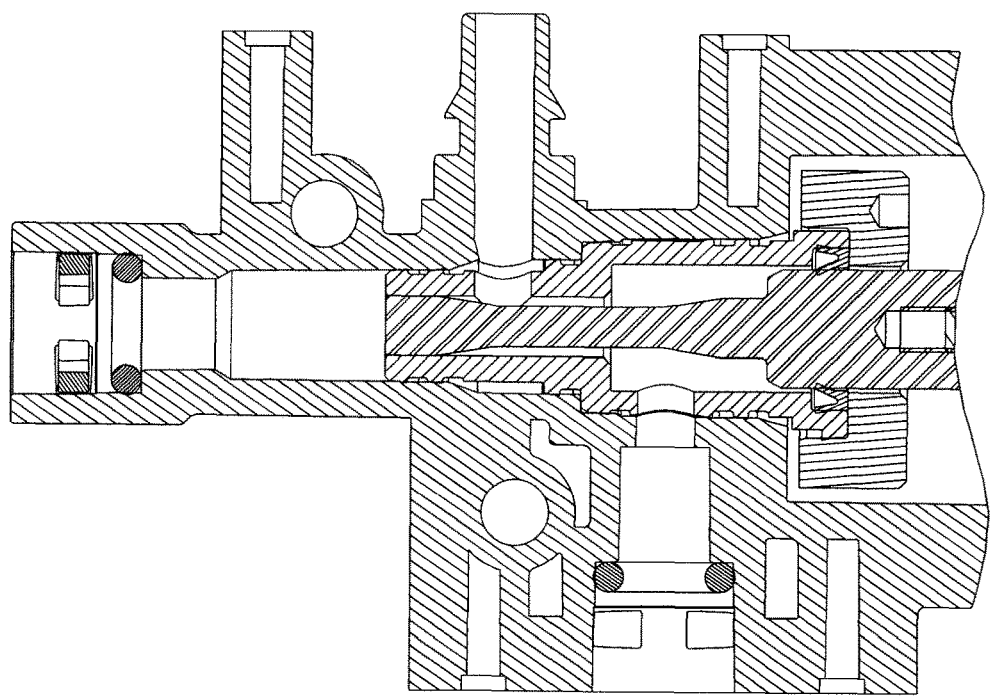

The FIGS. 5a to 5d show typical positions for the fluid distributor valve of the invention according to the embodiment within the regular operating range of repartitioning on the extreme left position before start of the capillary area (FIG. 5a), on the extreme left position on the capillary area (FIG. 5b), on the extreme right position before start of the capillary area (FIG. 5c) and on the extreme right position on the capillary area (FIG. 5d). The FIG. 6 shows a diagram relating the flow rate in l/h to the stroke of the valve shaft at an inlet flow rate of 120 l/h and an inlet pressure of 1 bar of the preferred embodiment. FIG. 7 shows a zoomed-in diagram relating the flow rate to the stroke of the valve shaft in the capillary area.

The cylindrical valve bore 17 is preferable formed in a cartridge 2 which is inserted and fixed in an external housing 3. Thus, the cartridge 2 and the housing 3 can be made from different materials wherein the material for the cartridge is one selected to reach very low tolerances for machining like stainless steel or brass. The housing can be made from a less costly material to implement the hydraulic connection functions of the inlet and outlets, i.e. any desired connectors leading to the inlet and outlet ports. The housing can be even made from suitable plastics material. If cost is not an issue the cartridge and the housing can be made from an integral part of material and machined according to the requirements.

The valve shaft 18 that includes, in this embodiment, the valve bodies 15, 16 of the two valve mechanisms, is in the form of a valve needle and is connected at an end protruding from the cartridge 2 to a motorized drive actuator 6.

The drive actuator can be a linear motor or a rotary motor coupled with a transmission in the form of a spindle drive converting the rotation to a linear stroke. The valve shaft 18 further can be arranged so as to allow it to be manually driven in the regular operating range, i.e. by providing a portion of the valve shaft or of the actuator axis that is accessible for a user on the outside of the casing where the user can grip and rotate the drive actuator axis or the valve shaft. The fluid-tightness of the cartridge 2 between the valve bore 17 and the valve shaft 18 on the side of the drive actuator is realized with a seal 4 and a flange part 5 attached to the cartridge 2 or (not shown) to the external housing so as to surround the protruding part of the valve shaft 18 (see FIG. 8).

The cartridge 2, in which the valve bore 17 is formed, and the valve shaft 18 are preferably designed to define a position along one or each of the opposite stroke directions where the two components can get in contact. These contact positions are outside the regular operating range of the valve mechanisms and preferably outside the valve bore with a spacing in the stroke direction from at least one or from both of the end positions of the regular operating range and they serve as a defined mechanical stop position. The valve is configured such that the valve shaft can be moved to such a mechanical stop position in a specific drive mode of the drive actuator that is distinct from the drive mode in which the valve is operated in the regular operating range. This mechanical stop position or dead stop position is necessary to initialize the "0" valve position (see FIG. 9) and the drive mode for moving the valve shaft to the stop position is selected and executed whenever it is necessary to initialize the valve drive parameters.

In one variant the linear actuator as an example of a drive actuator is equipped with an encoder for determining the moving position of the drive actuator and the mechanical stop is accordingly arranged to be used for calibrating the drive actuator. In another variant, for example where a step motor is used as the drive actuator, be it in the form of the linear motor or a rotary motor, the mechanical stop position is used to reset a counter and the steps of the step motor from the mechanical stop are subsequently counted to estimate the valve shaft position. Whenever needed the valve shaft can be moved to the mechanical stop position beyond the regular operating range by initiating and executing the specific drive mode in order to reset or recalibrate the drive actuator. Since the mechanical stop position for calibrating the drive actuator is outside the end positions of the regular operating range of the valve mechanisms, the contact of the valve shaft with the mechanical stop position does not lead to the braking or wedging issues at the flow rate repartitioning end positions and has accordingly no influence on the operation of the valve mechanisms.

If the valve shaft position is not read with an encoder but deducted or calculated, a gap 14 between the mechanical stop position and the maximum normal use end position should be implemented to avoid undesired collision with the dead stop. This gap should be implemented regarding the global tolerance of the system and the accuracy of the counting algorithm and could be, for example, 1 mm (see FIG. 5*b*).

On the other side a further mechanical stop position or dead stop may be provided to control a maximum valve shaft position beyond the regular operating range to the right, for example to avoid a leak risk when the valve is inoperative. This dead stop position, too, can be designed to be reached by the valve shaft only in case of a defect of the valve or prolonged periods of none-use or transport and a specific drive mode can be implemented for the drive actuator that will move the valve shaft to this dead stop position if executed. Again, a gap between the dead stop position and the maximum normal use end position can be implemented to avoid undesirable collision with the dead stop during regular operation. This gap should be implemented regarding the global tolerance of the system and the accuracy of the counting algorithm and it could be, for example, 1 mm.

The drive actuator accordingly has various operating modes, one where the valve shaft is driven in the regular operating range between the extreme left position of the valve shaft where the valve body of the right valve mechanism is located in the capillary area (see FIG. 5*b*) and the one where the valve body of the left valve mechanism is located in the capillary area (see FIG. 5*d*). The other drive modes that allow the valve shaft to be moved to the dead stop positions at right or left beyond the regular operating range must be initiated intentionally if, as described, a calibration of the drive actuator is desired or a complete closure of the valve for storage or transport or other purposes is desired.

The drive actuator can be configured to drive the valve shaft in the whole stroke length of the regular operating range where the repartitioning is made in a continuous movement or in a number of distinct pre-set steps and intermediate positions. Such moving behaviour can also be implemented in different drive modes of the drive actuator for the operation of the valve in the regular operating range.

While the preferred embodiment of the fluid distributor valve has the first and second valve bodies of the first and second valve mechanisms arranged on a common valve shaft in a linear arrangement in the continuous cylindrical valve bore and the inlet into the cylindrical valve bore is perpendicular to the stroke direction whereas the outlets from the valve bore communicating with the outlet ports are aligned in the stroke direction, a parallel arrangement would be feasible where the inlet is leading to a common inlet chamber from which valve bores of the respective valve mechanisms lead in parallel or in radial arrangement other than the aligned arrangement in the preferred embodiment.

The valve of the invention provides precise flow repartitioning of an inlet fluid stream towards two outlets from a drop-by-drop flow rate to a maximum flow rate. The valve moreover is cost effective because all product complexity is embedded essentially in only two elements, the cartridge 2 (where the cylindrical valve bore is formed) and the valve shaft 18 (including the valve bodies). In effect manufacturing precision even can be limited to the valve bodies since the minimum gap between the valve bore and the valve bodies is maintained even in the end positions of the regular operating range.

The fluid distributor valve of the invention is particularly suitable for use in a water purification and dispensing system comprising a closed water recirculation loop as disclosed in Applicant's parallel patent application filed on the same filing date. In this system the fluid distributor valve 1 described above can be implemented as the 3-way motorized valve 200 in an arrangement where the first outlet 11 is connected to the dispensing portion 106*a* of the recirculation loop 106 and the second outlet 12 is connected to the bypass passage 202 whereas the inlet 10 is connected to the motor recirculation loop 106. This arrangement is advantageous since the first outlet is located at a higher position than the second outlet and the latter could gather some sealing particulates due to sealing wear during valve operation.

Such a water purification and dispensing system 100 is shown in FIG. 10 and it comprises a closed water recirculation loop 106 which is, in its basic layout and components, similar to the one disclosed in the document EP 1814007A1 shown in FIG. 11.

The system of the invention accordingly includes a water inlet 101 for introducing water to be purified into the loop, a pumping means 103, preferably a positive displacement type pump, for pumping water through the water recirculation loop 106, thereby defining a preferred flow direction in the loop, and water purification means 150 for purifying the water downstream of the water inlet 101. The water purification means is shown as a functional block and may include various components, for example including inter alia one or more pre-treatment device(s), UV-lamp(s), mixed bed(s) of ion exchange resins, filter(s) etc. . . .

A dispensing portion 106a of the water recirculation loop includes one or more outlet(s) 102 for purified water which are respectively branched off from the water recirculation loop 106 (i.e. from the dispensing portion 106a thereof) downstream of the water purification means 150 and, for each of the outlets, a first valve 120 is arranged between each outlet 102 and the water recirculation loop 106 for controlled dispensing of the purified water from the recirculation loop 106 through the respective outlet 102 by operating the respective valve 120.

A second valve 130 is arranged in the dispensing portion 106a of the water recirculation loop 106 downstream of the one or more first valves 120, i.e. downstream of the last outlet 102, and upstream of the pumping means 103.

The structure of the outlets 102 can be preferably similar to the one disclosed in the document EP 1814007A1 and may accordingly include a H-manifold that allows the dispensing point to be attached to the dispensing portion 106a of the water recirculation loop 106 by means of two pipes with relatively small cross section and/or little stiffness/large elasticity to allow the dispensing point to be located in a hand-held device or mobile dispensing unit to be easily manipulated by a user to perform the dispensing tasks and to bring the actual outlet opening more easily to a desired location. The mobile dispensing unit may include the respective second valve 120 to be described later. A point-of-use dispensing system can be made up with two subassemblies including a base unit and a handheld device or dispenser handset, i.e. the mobile dispensing unit. The handheld device is connected to the base unit by the two small diameter pipes. The dispensing portion 106a of the recirculation loop 106 is connected to the base unit via an associated flow meter to be described later and the H-manifold, both located in the base unit. In the dispensing mode the two small diameter pipes are working as two pipes in parallel, thus having a small pressure drop, whereas in recirculation mode, the water is recirculated via these two pipes in series. The disclosure of the document EP 1814007A1 is introduced herein by reference with respect to the structure of the dispensing unit and the use and function of the H-manifold. The first valve(s) 120 and preferably the second valve 130 is/are solenoid valves of the type with a normally closed (NC) flowpath.

The system in which the fluid distributor valve of the invention can be advantageously equipped thus differs from the one disclosed in EP 1814007A1 inter alia by the provision of a bypass passage 202 branched from the water recirculation loop 106 and bypassing the dispensing portion 106a of the water recirculation loop 106 including the first valve(s) 120 and the second valve 130. The bypass passage also includes a third valve 200a for controlling the flow rate through the bypass passage 202. Preferably the system also includes a fourth valve 200b for controlling the flow rate into the dispensing portion 106a of the water recirculation loop. The third valve 200a, and, if provided, the fourth valve 200b are arranged to respectively control the flow rate through the bypass passage 202 and the flow rate into the dispensing portion 106a of the water recirculation loop in plural predefined steps or continuously. Preferably, the third valve 200a and the fourth valve 200b are integrated in the form of a three-way fluid distributor valve 200 according to the invention arranged to simultaneously control the flow rate through the bypass passage 202 and the flow rate into the dispensing portion 106a of the water recirculation loop. Preferably the third and fourth valves are provided in the form of the integrated three-way fluid distributor valve according to the invention such that they are arranged to simultaneously control the flow rates in opposite directions by a single activation, i.e. if the flow rate through the one valve is increased while the flow rate through the other valve is decreased, preferably in corresponding amounts. In other words, the third and fourth valves 200a, 200b are embodied by the first and second valve mechanisms 13, 14 of the fluid distributor valve described above. The three-way fluid distributor valve of such structure is preferably motorized to allow a precise setting and a remote operation by a controller.

In other words, in the most general aspect the incoming stream of the recirculation loop 106 downstream of the water purification means is split into two streams, one through the bypass passage 202 and one through the dispensing portion 106a, and the split ratio can be selectively set by the integrated three-way fluid distributor valve.

The system comprises a control unit for controlling the first valve(s) 120, the second valve 130, the third valve 200a and the pumping means 103, and, if provided, the fourth valve 200b, the latter preferably in the form of the single three-way fluid distributor valve. The control unit is arranged to perform the following control settings based on predefined programming.

In a recirculation mode the first valve(s) 120 is/are maintained closed, the second valve 130 is opened, the third valve 200a is operated to substantially or completely prevent the flow through the bypass passage 202, the fourth valve 200b is operated to allow flow into the dispensing portion 106a of the recirculation loop, and the pumping means 103 is operated at a constant, preferably the rated maximum flow rate to effect recirculation and avoid stagnation points in the system.

In a manual dispensing mode the first valve(s) 120 is/are selectively opened in response to a user operation, the second valve 130 is generally maintained closed, the third and fourth valves 200a, 200b are operated to allow at least some flow into the dispensing portion 106a of the water recirculation loop and to adjust the dispensing flow rate, and the pumping means 103 is operated, again preferably at a constant flow rate and preferably again at the maximum rated flow rate. In this mode the incoming stream is divided into two streams, the one that goes into the dispensing portion 106a and to the one or more outlets and the one that is recirculated through the bypass passage 202 more directly to the pump and the purification means. In the manual dispensing mode the system allows the user to dispense the purified water at any flow rate from drop-by-drop up to the full dispensing volume. The setting of the desired dispensing flow rate should preferably be linear and continuous but can be in predefined steps or progressive/degressive. The dispensing flow rate is set by appropriately setting the respective first valve(s) 120 and these valves are designed for this purpose.

Since the second valve 130 is a normally closed solenoid valve that is actuated during recirculation mode, the valve does not generate any pressure during recirculation. Since the second valve 130 is maintained closed during the dispensing modes, the pressure in the loop is mainly depending on the final filter of the purification means and the dispensing flow rate. Due to this configuration the purification loop is not pressurized when the system is at a standstill.

With this configuration the setting of the progressive dispensing from drop-by-drop to a full dispensing flow throughput is not dependent on the modulation of the operation of the motor pump but the pump can be operated at a constant, preferably the maximum rated throughput. The third and fourth valves 200a, 200b, preferably in the form of the motorized three-way fluid distributor valve 200, provide the pressure drop dynamic to ensure that the dispensing flow rate can be adjusted from drop-by-drop to full throughput and this is true whatever the pressure drop of the final filter of the purification means is. The throughput of the pumping means can be set at substantially the same value in all dispensing modes and in the recirculation mode in the preferred embodiment.

Preferably the dispensing portion 106a of the water recirculation loop 106 includes more than one, preferably up to three or even more different dispensing points in the form of the outlets 102 respectively provided with one first valve 120. Since the first valves can be individually operated, the system allows simultaneous dispensing in different modes at the various dispensing sites. Since the pumping means is operating at or nearly at rated pumping volume, the dispensing volume at one outlet is essentially independent from that at another outlet. If necessary, the third and fourth valves 200a, 200b can be adjusted to direct a larger flow volume into the dispensing portion 106a of the water recirculation loop if larger dispensing volumes at plural outlets are desired. If the system setting is such that the progressive and full dispensing volume at plural outlets is not possible due to limitations of the piping, of the pumping means etc., then the control unit can be programmed to deactivate the progressive dispensing and to allow only the manual dispensing or a limited dispensing volume at the respective outlets. In this case the maximum flow rate per outlet will be the maximum flow rate of the pump divided by the number of outlets that are opened or active.

The dispenser handset may include only the dispensing solenoid valve (first valve) 120 and the necessary electronics to control the valve. The third and fourth valves 200a, 200b (the motorized three-way fluid distributor valve 200) is preferably integrated in a system casing where the purification means and the pumping means are provided, too.

A further mode available in the system and the control unit is an automatic dispensing mode in which the first valve(s) 120 is/are selectively opened (in response to a user operation) until a predetermined or preset volume of the purified water is dispensed from the respective outlet 102, the second valve 130 is maintained closed, the third and fourth valves 200a, 200b are operated to allow at least some flow into the dispensing portion 106a of the water recirculation loop, and the pumping means 103 is operated, again preferably at the rated maximum pumping rate.

For this mode a flow meter 104-1, 104-2 is preferably located on the dispensing portion 106a of the recirculation loop 106 upstream of each first valve 120 for measuring the flow rate into the respective first valve 120. For the dispensing mode the control unit is arranged to open the first valve 120 of the respective outlet 102 in response to the user operation, to monitor the flow rate measured by the flow meter 104-1, 104-2 after the opening of the first valve 120, and to close the first valve 120 after it is determined based on the monitored flow rate, that the predetermined volume of purified water has been dispensed from the associated outlet 102.

In an alternative operating pattern of the automatic dispensing mode the control unit is arranged to open the first valve 120 of the respective outlet 102 in response to the user operation, to monitor the time lapsed after the opening of the first valve 120, and to close the first valve 120 after it is determined based on the monitored lapsed time and under consideration of the flow rate, that the predetermined volume of water has been dispensed from the associated outlet 102.

As mentioned above the respective flow meters are integrated in the base unit and thus still relatively close to the handheld unit so as to minimize variations of computed water volume if the flow meter were located at a more distant location in the recirculation loop due to piping deformation because of water temperature changes and/or loop internal pressure variations. It also reduces the time lag and improves the accuracy of the setting of the dispensed volume. In case an automated first valve 120 is used that has plural or indefinite settings for the throughput, the dispensing flow rate can be automatically slowed down when a set volume is nearly reached, thereby minimizing the response time effect or delay of the control board when closing the dispensing valve is required after the set volume is detected.

If automatic dispensing is required at plural consecutive outlets, the flow rate of outlet number 2 can be computed by means of flow meter 104-2 and the flow rate of outlet number 1 can be computed by flow meter 104-2 and 104-1 according to the formula:

Flowrate at outlet number 1=flowrate 104-1−flowrate 104-2.

The control unit also can be arranged to operate the third and the fourth valve 200a, 200b (the three-way fluid distributor valve 200) to adjust the pressure of the water in the dispensing portion 106a of the water recirculation loop to a predetermined value necessary to effect the respective operation and dispensing modes.

The invention claimed is:

1. A fluid distributor valve for repartitioning an inlet fluid stream into two outlet fluid streams (X,Y), comprising:
   an inlet port;
   two outlet ports;
   a first and a second valve mechanism, one arranged upstream each outlet port;
   wherein each valve mechanism comprises a valve body slidable in a cylindrical valve bore in reciprocating strokes through a valve shaft, wherein the valve body includes a first portion that is formed with a progressively changing diameter so as to reduce a valve gap between the valve bore inner peripheral wall and the valve body outer peripheral wall at a plane (A,B) perpendicular to the stroke direction, in a regular operating range of the valve mechanism, from a maximum valve gap to a minimum valve gap, to reduce or increase the flow rate through the gap towards the associated outlet port upon the relative movement, and
   wherein at least one said valve body of the valve mechanisms, is formed such that the minimum valve gap is maintained at the end position of the stroke of the valve body in the regular operating range.

2. The fluid distributor valve according to claim 1, wherein the at least one valve body has a second portion adjacent to the first portion formed with the progressively changing diameter that retains the diameter of the first portion, which defines the minimum valve gap, over a defined length in the stroke direction before the end position of the stroke of the valve body in the regular operating range is reached.

3. The fluid distributor valve according to claim 2, wherein the length of the second portion in the stroke direction is between 1 to 5 mm.

4. The fluid distributor valve according to claim 2, wherein the diameter defining the minimum valve gap and the length in the stroke direction of the second portion of the valve body are dimensioned such that the flow rate through the gap at the end position of the stroke of the valve body in the regular operating range is smaller than 1% of the inlet flow rate, at an inflow pressure of 0.1 to 6 bar.

5. The fluid distributor valve according to claim 1, wherein the first portions of the valve bodies of the two valve mechanisms are arranged such that their diameters change in opposite sense along the stroke direction.

6. The fluid distributor valve according to claim 5, wherein the valve bodies are formed such that the sum of the valve gaps at the planes (A,B) perpendicular to the stroke direction of the first portions of the two valve mechanisms is substantially constant at each valve shaft position in the regular operating range.

7. The fluid distributor valve according to claim 1, wherein the valve bodies of the first and second valve mechanisms are arranged on a common valve shaft arranged to be linearly movable in the stroke direction.

8. The fluid distributor valve according to claim 1, wherein the cylindrical valve bore is formed in a cartridge which is inserted and fixed in an external housing.

9. The fluid distributor valve according to claim 8, wherein the cartridge and the housing are made from different materials.

10. The fluid distributor valve according to claim 1, further comprising a drive actuator associated to the valve shaft for sliding the valve bodies in the reciprocating strokes.

11. The fluid distributor valve according to claim 10, wherein the drive actuator is a linear motor or a rotary motor, and in case of a rotary motor is coupled with a transmission converting the rotation to a linear stroke.

12. The fluid distributor valve according to claim 10, wherein the valve shaft has a mechanical stop position, arranged with a spacing in the stroke direction from at least one of the end positions of the regular operating range.

13. The fluid distributor valve according to claim 12, wherein the valve is configured such that the valve shaft can be moved to the mechanical stop position in a drive mode of the drive actuator that is distinct from the drive mode in which the valve is operated in the regular operating range.

14. The fluid distributor valve according to claim 12, wherein the drive actuator has an encoder for determining the moving position of the drive actuator and the mechanical stop is arranged to be used for calibrating the drive actuator.

15. The fluid distributor valve according to claim 1, wherein the valve shaft is arranged so as to allow it to be manually driven in the regular operating range.

16. The fluid distributor valve according to claim 1, wherein an inlet into the cylindrical valve bore communicating with the inlet port of the valve is perpendicular to the stroke direction and outlets from the valve bore communicating with the outlet ports are parallel to the stroke direction.

17. A water purification and dispensing system comprising a (closed) water recirculation loop including
   a water inlet for introducing water to be purified;
   a pump for pumping water through said water recirculation loop in a flow direction;
   a water purifier for purifying water downstream of said water inlet;
   a dispensing portion of the water recirculation loop including one or more outlet(s) for purified water branched from said water recirculation loop downstream of said water purifier;
   a first valve arranged between each outlet and said water recirculation loop, for controlled dispensing of the purified water from said recirculation loop through the respective outlet;
   a second valve arranged in said dispensing portion of the water recirculation loop downstream of said first valve(s) and upstream of said pump;
   a bypass passage branched from said water recirculation loop and bypassing said dispensing portion of the water recirculation loop including said first valve(s) and said second valve,
   a third valve for controlling the flow rate through said bypass passage, and
   a fourth valve for controlling the flow rate into said dispensing portion of the water recirculation loop including said first valve(s) and said second valve, wherein said third valve and said fourth valve are integrated in the form of a fluid distributor valve as defined in claim 1.

18. The fluid distributor valve according to claim 10, wherein the drive actuator is a step motor.

19. The fluid distributor valve according to claim 12, wherein the mechanical stop position is outside the cylindrical valve bore.

20. The fluid distributor valve according to claim 1, wherein each said valve body of said first and a second valve mechanisms is formed such that the minimum valve gap is maintained at the end position of the stroke of the valve body in the regular operating range.

* * * * *